US010838992B2

(12) United States Patent
Allen et al.

(10) Patent No.: US 10,838,992 B2
(45) Date of Patent: Nov. 17, 2020

(54) CONTENT SELECTION FOR USAGE WITHIN A POLICY

(71) Applicant: International Business Machines Corporation, Armonk, NY (US)

(72) Inventors: Corville O. Allen, Morrisville, NC (US); John M. Cusick, Harrison, NY (US); Andrew R. Freed, Cary, NC (US); Shannen B. Lambdin, Morrisville, NC (US); Nicolas B. Lopez, Austin, TX (US); Anuj Sharma, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 15/239,246

(22) Filed: Aug. 17, 2016

(65) Prior Publication Data

US 2018/0052914 A1    Feb. 22, 2018

(51) Int. Cl.
*G06F 16/33* (2019.01)
*G06F 16/901* (2019.01)
(Continued)

(52) U.S. Cl.
CPC ...... *G06F 16/3344* (2019.01); *G06F 16/9024* (2019.01); *G06F 16/9535* (2019.01); *G06F 40/194* (2020.01)

(58) Field of Classification Search
CPC ........... G06F 17/30684; G06F 17/2775; G06F 17/30867; G06F 17/30958; G06F 17/30675; G06F 17/30011; G06F 17/30654; G06F 16/3344; G06F 16/9535; G06F 16/9024; G06F 40/194
See application file for complete search history.

(56) References Cited

U.S. PATENT DOCUMENTS 6,490,549 B1 * 12/2002 Ulicny ................. G06F 40/232
                                                                        704/10
6,532,444 B1 *  3/2003 Weber .................... G06F 17/27
                                                                        704/257

(Continued)

OTHER PUBLICATIONS

Alguliev et al.; "Evolutionary Algorithm for Extractive Text Summarization"; Intelligent Information Management; 2009; 1; pp. 128-138; Scientific Research.

(Continued)

*Primary Examiner* — Boris Gorney
*Assistant Examiner* — Vaishali Shah
(74) *Attorney, Agent, or Firm* — Stephanie L. Carusillo (57) ABSTRACT

In an approach to content selection, one or more computer processors receive a first query from a user. The one or more computer processors retrieve a first response for the first query. The one or more computer processors determine whether the first response exceeds a threshold for a policy for content usage associated with the first response, wherein the policy for content usage specifies one or more restrictions for usage of a content asset. In response to determining the first response exceeds the threshold for the policy for content usage, the one or more computer processors select a first subset of the first response to meet the threshold for the policy for content usage. The one or more computer processors send the first subset of the first response to the user.

17 Claims, 4 Drawing Sheets

(51) Int. Cl.
*G06F 16/9535* (2019.01)
*G06F 40/194* (2020.01)

(56) References Cited

U.S. PATENT DOCUMENTS

| | | | | |
|---|---|---|---|---|
| 8,442,940 | B1* | 5/2013 | Faletti | G06F 17/2785 |
| | | | | 707/610 |
| 8,630,959 | B2 | 1/2014 | Petri et al. | |
| 8,738,365 | B2 | 5/2014 | Ferrucci et al. | |
| 8,898,159 | B2 | 11/2014 | Brown et al. | |
| 9,129,213 | B2 | 9/2015 | Clark et al. | |
| 9,183,511 | B2 | 11/2015 | Li et al. | |
| 9,304,985 | B1* | 4/2016 | Raghunathan | G06F 17/27 |
| 2009/0094211 | A1* | 4/2009 | Marvit | G06F 17/30672 |
| 2013/0304818 | A1* | 11/2013 | Brumleve | H04L 67/02 |
| | | | | 709/204 |
| 2014/0280623 | A1* | 9/2014 | Duan | H04L 51/02 |
| | | | | 709/206 |
| 2015/0006258 | A1* | 1/2015 | Salama | G06Q 30/0206 |
| | | | | 705/7.35 |
| 2015/0006512 | A1* | 1/2015 | Alfonseca | G06F 17/24 |
| | | | | 707/722 |
| 2015/0134597 | A1* | 5/2015 | Badea | G06F 19/326 |
| | | | | 707/603 |
| 2015/0161131 | A1* | 6/2015 | Provine | G06F 17/30867 |
| | | | | 707/731 |
| 2016/0055234 | A1 | 2/2016 | Visotski et al. | |
| 2016/0098737 | A1 | 4/2016 | Berajawala et al. | |
| 2016/0253710 | A1* | 9/2016 | Publicover | H04W 4/21 |
| | | | | 705/14.66 |
| 2017/0132329 | A1* | 5/2017 | Yakout | G06F 17/30958 |
| 2017/0257524 | A1* | 9/2017 | Nishikuni | H04N 1/00795 |

OTHER PUBLICATIONS

Hovy et al.; "Question Answering in Webclopedia"; 2000; 10 pages.
Ittycheriah et al.; "IBM's Statistical Question Answering System"; 2000; pp. 1-6.
"U.S. Copyright Office Fair Use Index"; Index last updated Mar. 2016; 3 pages; <http://www.copyright.gov/fls/fl102.html>.
"How Content ID works"; YouTube; Printed Jun. 21, 2016; 2 pages; <https://support.google.com/youtube/answer/2797370?hl=en>.

* cited by examiner

CONTENT SELECTION FOR USAGE WITHIN A POLICY

BACKGROUND OF THE INVENTION

The present invention relates generally to the field of natural language processing, and more particularly to content selection for usage within a pre-defined policy.

Natural language processing (NLP) is a field of computer science, artificial intelligence, and linguistics concerned with the interactions between computers and human (natural) languages. As such, natural language processing is related to the area of human-computer interaction. Many challenges in natural language processing involve natural language understanding, that is, enabling computers to derive meaning from human or natural language input.

Automatic summarization is the process of reducing a text document with a computer program in order to create a summary that retains key points of the original document. Technologies that can make a coherent summary take into account variables such as length, writing style, and syntax. Automatic data summarization is part of machine learning and data mining. The main idea of summarization is to find a representative subset of the data, which contains the information of the entire set. Summarization technologies are used in a large number of sectors in industry, for example, search engines. Other examples include document summarization, image collection summarization, and video summarization. Document summarization tries to automatically create a representative summary or abstract of the entire document by finding the most informative sentences.

SUMMARY

Embodiments of the present invention disclose a method, a computer program product, and a system for content selection. The method may include one or more computer processors receiving a first query from a user. The one or more computer processors retrieve a first response for the first query. The one or more computer processors determine whether the first response exceeds a threshold for a policy for content usage associated with the first response, wherein the policy for content usage specifies one or more restrictions for usage of a content asset. In response to determining the first response exceeds the threshold for the policy for content usage, the one or more computer processors select a first subset of the first response to meet the threshold for the policy for content usage. The one or more computer processors send the first subset of the first response to the user.

DETAILED DESCRIPTION

Systems such as search engines and question and answer (QA) systems rely on large quantities of information from which the system can draw relationships and build consensus in order to confidently and effectively respond to a query, via natural language processing (NLP), and provide a user with summarized content. The information can come in the form of journal articles, books, news articles, and other knowledge sources. In many cases, the content includes usage policies which may restrict the amount of content to that which can be extracted without a need for some kind of permission or payment. Embodiments of the present invention recognize that efficiency may be gained by reducing the amount of content in a query result to meet content usage policies such that neither the system nor the user has to account for usage policy obligations, saving both time and money. Embodiments of the present invention provide a method to scan content and return short, high value passages that provide answers to queries within the limitations of content usage policies. Implementation of embodiments of the invention may take a variety of forms, and exemplary implementation details are discussed subsequently with reference to the Figures.

Figure 1:
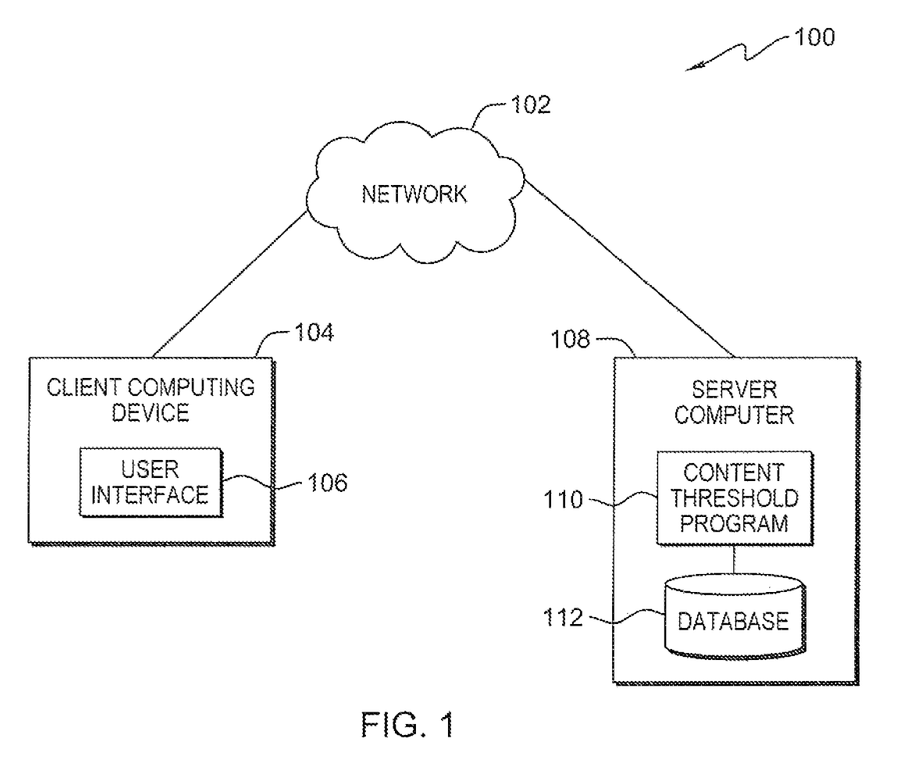
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 includes user interface 106.

User interface 106 provides an interface between a user of client computing device 104 and server computer 108. In one embodiment, user interface 106 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 106 may also be mobile application software that provides an interface between a user of client computing device 104 and server computer 108. Mobile application software, or an "app," is a computer program designed to run on smart phones, tablet computers and other mobile devices. User interface 106 enables a user of client computing device 104 to submit queries and receive answers with supporting data from server computer 108. In an embodiment, user interface 106 is an application interface which enables an application to submit queries and receive answers with supporting data from server computer 108.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. In one embodiment, server computer 108 is a question and answer (QA) system. QA systems provide automated mechanisms for searching through large sets of sources of content, and analyze them with regard to an input question to determine an answer to the question and a confidence measure as to how accurate an answer is for answering the input question. Server computer 108 includes content threshold program 110 and database 112. Server computer 108 may include internal and external hardware components, as depicted and described in further detail with respect to FIG. 4.

Content threshold program 110 extracts material from content in a manner that does not violate any imposed content usage policies. In addition, content threshold program 110 provides concise answers to user queries, reducing the time required to read and process the response. In an embodiment, a response includes an answer and supporting data. The supporting data may include, but is not limited to, text, video, audio, or images. Content threshold program 110 receives a query and retrieves one or more responses. Content threshold program 110 determines whether the response exceeds a threshold defined by a content usage policy, where the threshold may be an amount of information, such as a number of lines, words, or sentences, or a type of information, such as results or conclusions. If the response exceeds the threshold, then content threshold program 110 selects a subset of the response that answers the query in a manner that does not exceed the threshold and sends the response to the user. If the user requests an expanded response that exceeds the threshold, then content threshold program 110 determines the policy obligation and sends the expanded response. In one embodiment, content threshold program 110 is a standalone program. In another embodiment, content threshold program 110 may be integrated into one or more of a plurality of search engines or QA systems, as would be recognized by one skilled in the art. Content threshold program 110 is depicted and described in further detail with respect to FIG. 2.

Database 112 is a repository for data used by content threshold program 110. In the depicted embodiment, database 112 resides on server computer 108. In another embodiment, database 112 may reside elsewhere within distributed data processing environment 100 provided content threshold program 110 has access to database 112. A database is an organized collection of data. Database 112 can be implemented with any type of storage device capable of storing data and configuration files that can be accessed and utilized by server computer 108, such as a database server, a hard disk drive, or a flash memory. Database 112 stores one or more content usage policies. Database 112 may also store a corpus of data and information from which content threshold program 110 retrieves query responses.

Figure 2:
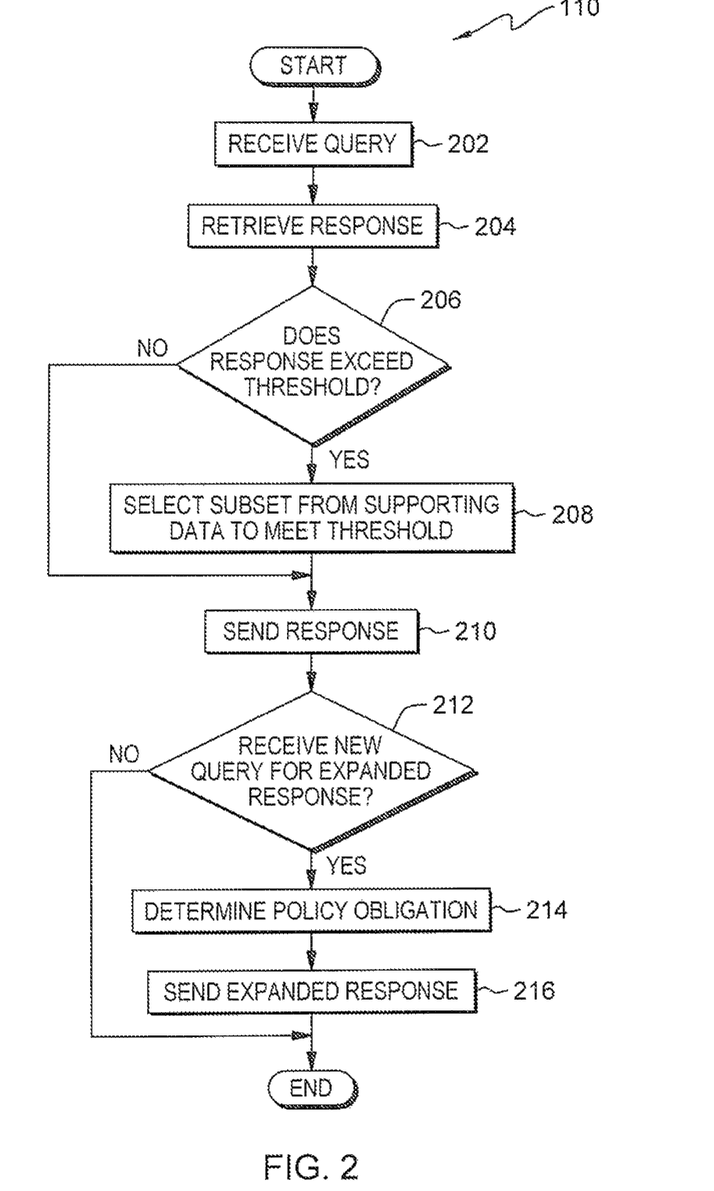
FIG. 2 is a flowchart depicting operational steps of a content threshold program, on a server computer within the distributed data processing environment of FIG. 1, for selecting content to meet a threshold, in accordance with an embodiment of the present invention.

FIG. 2 is a flowchart depicting operational steps of content threshold program 110, on server computer 108 within distributed data processing environment 100 of FIG. 1, for selecting content to meet a threshold, in accordance with an embodiment of the present invention.

Content threshold program 110 receives a query (step 202). Content threshold program 110 receives a request for information from a user, via user interface 106. In one embodiment, content threshold program 110 receives the query in the form of a question. In another embodiment, content threshold program 110 may receive the query in the form of a keyword search.

Content threshold program 110 retrieves a response (step 204). As would be recognized by one skilled in the art, content threshold program 110 generates one or more answers to the query by retrieving supporting data passages from a plurality of knowledge sources, such as journal articles, books, news articles, etc. Knowledge sources may include audio and video content in addition to text. One or more knowledge sources may reside in database 112 or elsewhere within distributed data processing environment 100, provided content threshold program 110 can access the knowledge sources via network 102.

In an embodiment where content threshold program 110 is a standalone program, steps 202 and 204 may be performed by a search engine or QA system, and content threshold program 110 receives the retrieved response from the search engine or QA system.

Content threshold program 110 determines whether the retrieved response exceed a threshold (decision block 206). A content usage policy specifies restrictions or conditions for usage of a content asset, where a content asset is information owned or controlled by a knowledge source which may be in the form of text, video, audio, or image. Examples of content usage policies include, but are not limited to, copyright fair use, contract rules, publication rules, citation restrictions, and document guidelines. In one embodiment, various factors may be included in the content usage policy. In the example of copyright fair use, the purpose of the use may be a factor, such as whether the content will be used for educational or commercial purposes. The nature of the content may also be a factor, such as whether the content is fiction or non-fiction. In addition, the amount of the original work copied as well as the effect on the market for the original may also be factors in the content usage policy of copyright fair use. In many instances, a content usage policy includes a threshold for a measure of content that can be used with no further obligation by the user or the search results provider, where an obligation may include a payment or permission requirement. For example, a content usage policy may specify an amount of a work that can be reproduced with no obligation, such as a word count, a percentage of words or sentences, a number of images, or a duration of a video or audio recording. In another example, a content usage policy may restrict usage of text that can have an adverse effect on the value of the original work, such as a conclusions paragraph of a research paper, where providing a user with the conclusions diminishes the value of the full paper. A content usage policy may also take into account the purpose of the system that handles the query. For example, a system used for education may be less likely to violate a content usage policy than a system used for commercial purposes. Content threshold program 110 reviews each of the retrieved passages, determines whether a content usage policy has imposed a usage threshold on the source of the material, and, if so, determines whether one or more of the retrieved responses exceed the threshold.

In one embodiment, content threshold program 110 assigns a score to one or more factors that may each have a threshold or may be combined for a single threshold. For example, if the purpose of the use is a factor, then the content usage policy may define a score of 0.2 for an educational purpose and a score of 0.8 for a commercial purpose. In another example, if the amount of the original work copied is a factor, then the content usage policy may define a score based on the percentage of the work copied. In the embodiment, content threshold program 110 may combine intermediate scores to calculate a final score. For example, content threshold program 110 may use a weighted average of the intermediate scores for each factor to determine a final score. In another example, content threshold program 110 may use a maximizing scheme, such that content threshold program 110 uses the maximum of any intermediate scores. In a further example, content threshold program 110 may use machine learning to determine the weights of each factor.

If content threshold program 110 determines the retrieved response exceeds a threshold ("yes" branch, decision block 206), then content threshold program 110 selects a subset from the supporting data to meet the threshold (step 208). If the content usage policy restricts the number of words or sentences that can be used, then content threshold program 110 attempts to reduce the size of a passage while still retaining the meaning in order to provide the most satisfactory supporting evidence. In one embodiment, content threshold program 110 utilizes a knowledge graph technique to select a subset of supporting data. In the embodiment, content threshold program 110 creates a knowledge graph of the original passage, as would be recognized by one skilled in the art. Content threshold program 110 creates one or more subsets of the original passage and generates a knowledge graph associated with each of the subsets. Content threshold program 110 determines which of the subsets has a similar knowledge graph to the original passage with respect to question terms and the answer. For example, content threshold program 110 may choose the subset with the same number of nodes on the knowledge graph connected to the answer as the knowledge graph associated with the original passage. In another example, content threshold program 110 may choose the subset with the most nodes connected to the answer. In a further example, content threshold program 110 may choose the subset with the most nodes connected to the same subject matter as the nodes of the knowledge graph associated with the original passage. Content threshold program 110 chooses the smallest subset, i.e., the subset with the least number of words or sentences, depending on the policy, with a similar knowledge graph. The knowledge graph technique for selecting a subset of supporting data to meet the threshold is described in further detail with respect to FIG. 3. In an embodiment where the content usage policy restricts the number of words or sentences that can be used, if content threshold program 110 does not generate a useful passage through size reduction of the original passage, then content threshold program 110 may select a secondary passage and repeat the subset selection process.

In another embodiment, content threshold program 110 may use an alternative remedy, based on the content usage policy restriction. For example, if the content usage policy restricts the number of images displayed, then content threshold program 110 may select a subset of images. In another example, if the content usage policy restricts the amount of a single image that may be displayed, then content threshold program 110 may reduce the number of pixels in the image, create a lower resolution image, or blur out portions of the image. In another embodiment, in order to reduce the number of words or sentences, content threshold program 110 may include a hyperlink or reference link in the response which enables the user to find the information without exceeding the content usage policy threshold. In a further embodiment, content threshold program 110 may substitute abbreviations to reduce word or character count. For example, content threshold program 110 may indicate that after the first usage of the name "International Business Machines Corporation," the corporation will be referred to as an acronym, i.e., "hereinafter IBM."

Responsive to selecting a subset of the supporting data, or if content threshold program 110 determines the retrieved response does not exceed a threshold ("no" branch, decision block 206), then content threshold program 110 sends the response (step 210). Content threshold program 110 provides a response to the user's query via user interface 106. For example, if the user's query asked "How large is a stage two brain cancer tumor?", then content threshold program 110 can return several short passages to the user, each of which specify that a "stage two brain cancer tumor is between five and eight millimeters in diameter." Content threshold program 110 provides a consensus-based and knowledge-backed answer without having to supply an entire journal article, which could have violated a content usage policy, such as copyright fair use. In one embodiment, if the response is a subset of the original passage, content threshold program 110 includes one or more clues with the response, such as an icon or text, which indicates the passage has been truncated or reduced.

Content threshold program 110 determines whether a new query requesting an expanded response is received (decision block 212). After reviewing the response to the query, the user determines whether the returned passages are sufficient to their needs. If the user determines that one or more of the subset responses is insufficient, then the user may click on an icon, text, etc., associated with a truncated passage to initiate a request for an expanded response. If content threshold program 110 determines a new query requesting an expanded response is not received ("no" branch, decision block 212), then content threshold program 110 ends.

If content threshold program 110 determines a new query requesting an expanded response is received ("yes" branch, decision block 212), then content threshold program 110 determines a policy obligation (step 214). Content threshold program 110 refers to the content usage policy associated with the knowledge source from which the expanded response was retrieved to determine an obligation to the knowledge source for use of the passage. For example, if there is a pay-per-use or lump sum content licensing agreement in place, then content threshold program 110 determines the cost of the usage. In another example, if there is a reporting obligation, then content threshold program 110 initiates a report. In a further example, if the content usage policy states that content may be used as long as the name of the knowledge source is included in the response, then content threshold program 110 determines the name of the knowledge source. In yet another example, if the content usage policy states that the abstract of an article can be used but the results paragraph cannot be used, then content threshold program 110 determines whether the selected subset is acceptable. In one embodiment, content threshold program 110 alerts the appropriate administrator of a determined policy obligation. For example, if content threshold program 110 determines the policy obligation is a pay-per-use content licensing agreement, then content threshold program 110 can alert a system administrator that a payment is required. In one embodiment, content threshold program 110 alerts the user that the expanded response includes a policy obligation, and offers the user a choice of whether to proceed with sending the expanded response.

Content threshold program 110 sends an expanded response (step 216). Content threshold program 110 sends the original version of the one or more requested passages to the user via user interface 106. If the content usage policy requires any special annotation of the content in the expanded response, then content threshold program 110 includes the annotation sending the response.

Figure 3:
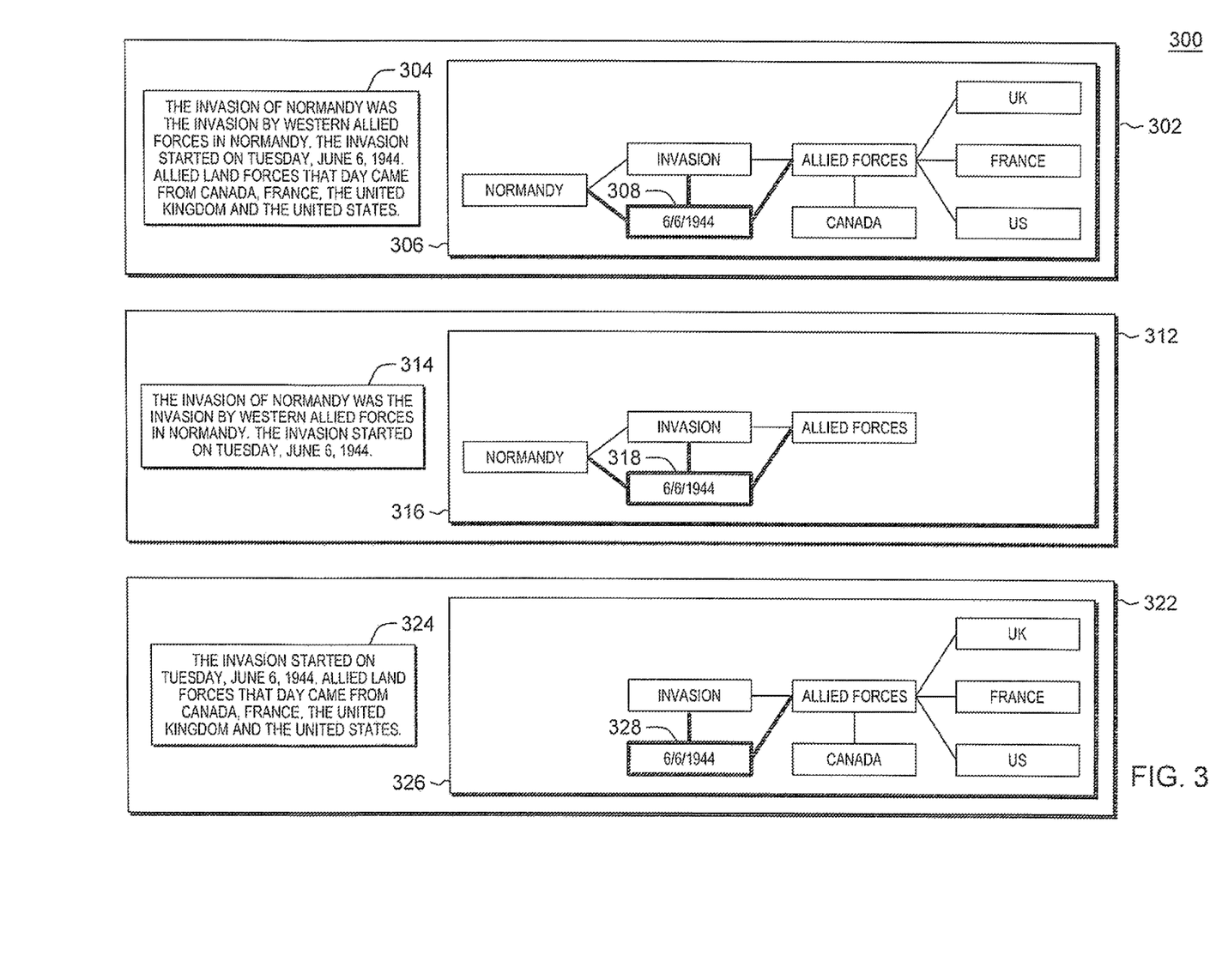
FIG. 3 illustrates an example of the use of the content threshold program, in accordance with an embodiment of the present invention.

FIG. 3 illustrates example 300 of the use of content threshold program 110, in accordance with an embodiment of the present invention. Example 300 depicts a response from a knowledge source to the query "When was the invasion of Normandy?" where the answer is Jun. 6, 1944, and the content usage policy restricts the number of sentences to less than three. Box 302 includes original passage 304 and associated knowledge graph 306. Original passage 304 includes three sentences, and therefore it violates the content usage policy. Knowledge graph 306 depicts facts, or key concepts, included in original passage 304 and how the facts relate to each other. The relationships are depicted by connecting lines representing nodes. Box 308 is the actual answer to the query, connected to three nodes, shown as bold lines.

Reduction 312 is a first attempt by content threshold program 110 to select a subset of original passage 304. Passage 314 includes two sentences, so it does not exceed the content usage policy threshold. Knowledge graph 316, associated with passage 314, includes box 318 which is the actual answer to the query, connected to three nodes. Knowledge graph 316 is smaller than knowledge graph 306 because there is less information in passage 314.

Reduction 322 is a second attempt by content threshold program 110 to select a subset of original passage 304. Similar to passage 314, passage 324 includes two sentences, so it does not exceed the content usage policy threshold. Knowledge graph 326, associated with passage 324, includes box 328 which is the actual answer to the query, however box 328 is only connected to two nodes.

In example 300, content threshold program 110 chooses reduction 312 as the subset of supporting data to send to the user because passage 314 does not exceed the threshold of the content usage policy, and knowledge graph 316 resembles knowledge graph 306 more than does knowledge graph 326 due to the similarity of the connected nodes, both in number and in subject matter. Although knowledge graph 326 appears larger, the extra facts are not useful toward the actual answer, as indicated by the indirect connection to the answer.

Figure 4:
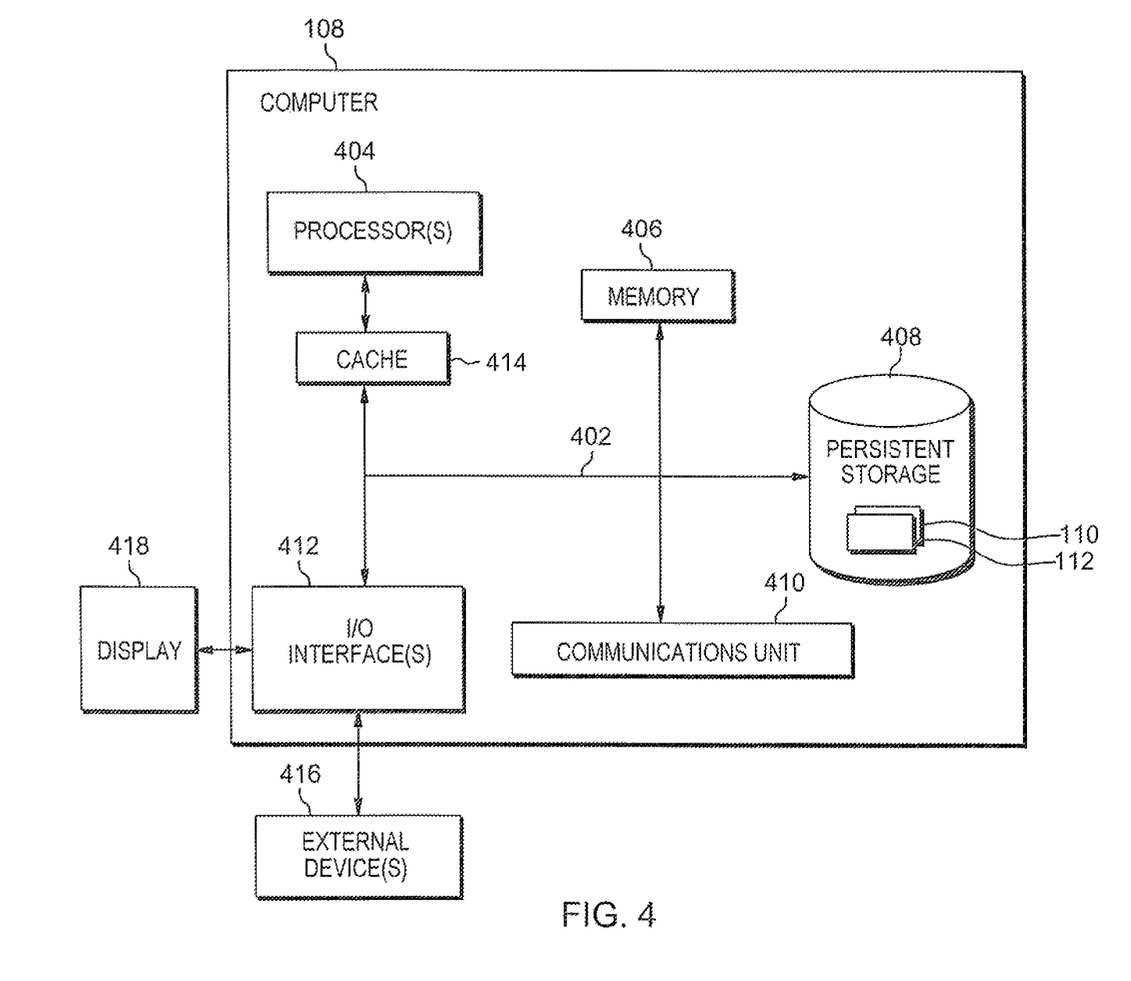
FIG. 4 depicts a block diagram of components of the server computer executing the content threshold program within the distributed data processing environment of FIG. 1, in accordance with an embodiment of the present invention.

FIG. 4 depicts a block diagram of components of server computer 108 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 108 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., content threshold program 110 and database 112 can be stored in persistent storage 408 for execution and/or access by one or more of the respective processor(s) 404 of server computer 108 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 104. In these examples, communications unit 410 includes one or more network interface cards. Communications unit 410 may provide communications through the use of either or both physical and wireless communications links. Content threshold program 110 and database 112 may be downloaded to persistent storage 408 of server computer 108 through communications unit 410.

I/O interface(s) 412 allows for input and output of data with other devices that may be connected to server computer 108. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., content threshold program 110 and database 112 on server computer 108, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for content selection, the method comprising:
receiving, by one or more computer processors, a first query from a user;
retrieving, by the one or more computer processors, a first response for the first query, wherein the first response is an answer to the query, and wherein the first response includes at least text and a first image;
determining, by the one or more computer processors, whether the first response exceeds a threshold for a policy for content usage associated with the first response, wherein the threshold for the policy for content usage specifies two or more restrictions for usage of a content asset, and wherein a first restriction is a requirement to omit a conclusions paragraph and a second restriction is a requirement for a low resolution image;
responsive to determining the first response exceeds the threshold for the policy for content usage, creating, by the one or more computer processors, a first knowledge graph associated with a set of text of an original passage within the first response to the first query;
creating, by the one or more computer processors, one or more subsets of the set of text of the original passage, wherein the one or more subsets of the set of text of the original passage include one or more abbreviations substituted for one or more words of the text;
generating, by the one or more computer processors, one or more additional knowledge graphs associated with the one or more subsets of the set of text of the original passage;
determining, by the one or more computer processors, a first subset of the one or more subsets of the set of text of the original passage is associated with a knowledge graph most similar to the first knowledge graph associated with the set of text of the original passage;
selecting, by the one or more computer processors, using one or more natural language processing techniques, the first subset associated with the knowledge graph most similar to the first knowledge graph associated with the set of text of the original passage;
generating, by the one or more computer processors, from the first image, a second image by reducing a number of pixels in the first image to meet the threshold for the policy for content usage; and
sending, by the one or more computer processors, a first subset of the first response to the user, wherein the first subset of the first response includes the first subset associated with the knowledge graph most similar to the first knowledge graph associated with the set of text of the original passage and the second image.

2. The method of claim 1, further comprising:
receiving, by the one or more computer processors, a second query from the user, wherein the second query requests expanding the first subset of the first response of the first query, wherein an expanded first subset of the first response exceeds the threshold for the policy for content usage;
determining, by the one or more computer processors, an obligation resulting from exceeding the threshold for the policy for content usage; and
sending, by the one or more computer processors, the expanded first subset of the first response to the user.

3. The method of claim 1, wherein determining the first subset of the one or more subsets of the set of text of the original passage is associated with the knowledge graph most similar to the first knowledge graph associated with the set of text of the original passage further comprises choosing, by the one or more computer processors, a subset with a same number of nodes connected to an answer on an associated knowledge graph as are connected to an answer on the first knowledge graph associated with the set of text of the original passage.

4. The method of claim 1, wherein selecting the first subset associated with the knowledge graph most similar to the first knowledge graph associated with the set of text of the original passage further comprises choosing, by the one or more computer processors, a subset with a least number of words with a similar knowledge graph.

5. The method of claim 1, wherein the policy for content usage specifies one or more conditions for usage of the content asset, wherein the content asset is information controlled by a knowledge source, and wherein the policy for content usage includes one or more of a copyright fair use factor, a contract rule, a publication rule, a citation restriction, and a document guideline.

6. The method of claim 1, wherein sending the first subset of the first response to the user further comprises including, by the one or more computer processors, one or more clues that indicate that the response is a subset of the original passage.

7. A computer program product for content selection, the computer program product comprising:

one or more computer readable storage devices and program instructions stored on the one or more computer readable storage devices, the stored program instructions comprising:
program instructions to receive a first query from a user;
program instructions to retrieve a first response for the first query, wherein the first response is an answer to the query, and wherein the first response includes at least text and a first image;
program instructions to determine whether the first response exceeds a threshold for a policy for content usage associated with the first response, wherein the threshold for the policy for content usage specifies two or more restrictions for usage of a content asset, and wherein a first restriction is a requirement to omit a conclusions paragraph and a second restriction is a requirement for a low resolution image;
responsive to determining the first response exceeds the threshold for the policy for content usage, program instructions to create a first knowledge graph associated with a set of text of an original passage within the first response to the first query;
program instructions to create one or more subsets of the set of text of the original passage, wherein the one or more subsets of the set of text of the original passage include one or more abbreviations substituted for one or more words of the text;
program instructions to generate one or more additional knowledge graphs associated with the one or more subsets of the set of text of the original passage;
program instructions to determine a first subset of the one or more subsets of the set of text of the original passage is associated with a knowledge graph most similar to the first knowledge graph associated with the set of text of the original passage;
program instructions to select, using one or more natural language processing techniques, the first subset associated with the knowledge graph most similar to the first knowledge graph associated with the set of text of the original passage;
program instructions to generate, from the first image, a second image by reducing a number of pixels in the first image to meet the threshold for the policy for content usage; and
program instructions to send a first subset of the first response to the user, wherein the first subset of the first response includes the first subset associated with the knowledge graph most similar to the first knowledge graph associated with the set of text of the original passage and the second image.

8. The computer program product of claim 7, the stored program instructions further comprising:
program instructions to receive a second query from the user, wherein the second query requests expanding the first subset of the first response of the first query, wherein an expanded first subset of the first response exceeds the threshold for the policy for content usage;
program instructions to determine an obligation resulting from exceeding the threshold for the policy for content usage; and
program instructions to send the expanded first subset of the first response to the user.

9. The computer program product of claim 7, wherein the program instructions to determine the first subset of the one or more subsets of the set of text of the original passage is associated with the knowledge graph most similar to the first knowledge graph associated with the set of text of the original passage comprise program instructions to choose a subset with a same number of nodes connected to an answer on an associated knowledge graph as are connected to an answer on the first knowledge graph associated with the set of text of the original passage.

10. The computer program product of claim 7, wherein the program instructions to select the first subset associated with the knowledge graph most similar to the first knowledge graph associated with the set of text of the original passage comprise program instructions to choose a subset with a least number of words with a similar knowledge graph.

11. The computer program product of claim 7, wherein the policy for content usage specifies one or more conditions for usage of the content asset, wherein the content asset is information controlled by a knowledge source, and wherein the policy for content usage includes one or more of a copyright fair use factor, a contract rule, a publication rule, a citation restriction, and a document guideline.

12. The computer program product of claim 7, wherein the program instructions to send the first subset of the first response to the user comprise program instructions to include one or more clues that indicate that the response is a subset of the original passage.

13. A computer system for content selection, the computer system comprising:
one or more computer processors;
one or more computer readable storage device;
program instructions stored on the one or more computer readable storage devices for execution by at least one of the one or more computer processors, the stored program instructions comprising:
program instructions to receive a first query from a user;
program instructions to retrieve a first response for the first query, wherein the first response is an answer to the query, and wherein the first response includes at least text and a first image;
program instructions to determine whether the first response exceeds a threshold for a policy for content usage associated with the first response, wherein the threshold for the policy for content usage specifies two or more restrictions for usage of a content asset, and wherein a first restriction is a requirement to omit a conclusions paragraph and a second restriction is a requirement for a low resolution image;
responsive to determining the first response exceeds the threshold for the policy for content usage, program instructions to create a first knowledge graph associated with a set of text of an original passage within the first response to the first query;
program instructions to create one or more subsets of the set of text of the original passage, wherein the one or more subsets of the set of text of the original passage include one or more abbreviations substituted for one or more words of the text;
program instructions to generate one or more additional knowledge graphs associated with the one or more subsets of the set of text of the original passage;
program instructions to determine a first subset of the one or more subsets of the set of text of the original passage is associated with a knowledge graph most similar to the first knowledge graph associated with the set of text of the original passage;
program instructions to select, using one or more natural language processing techniques, the first subset associated with the knowledge graph most similar to the first knowledge graph associated with the set of text of the original passage;

program instructions to generate, from the first image, a second image by reducing a number of pixels in the first image to meet the threshold for the policy for content usage; and program instructions to send a first subset of the first response to the user, wherein the first subset of the first response includes the first subset associated with the knowledge graph most similar to the first knowledge graph associated with the set of text of the original passage and the second image.

14. The computer system of claim 13, the stored program instructions further comprising:

program instructions to receive a second query from the user, wherein the second query requests expanding the first subset of the first response of the first query, wherein an expanded first subset of the first response exceeds the threshold for the policy for content usage;

program instructions to determine an obligation resulting from exceeding the threshold for the policy for content usage; and program instructions to send the expanded first subset of the first response to the user.

15. The computer system of claim 13, wherein the program instructions to determine the first subset of the one or more subsets of the set of text of the original passage is associated with the knowledge graph most similar to the first knowledge graph associated with the set of text of the original passage comprise program instructions to choose a subset with a same number of nodes connected to an answer on an associated knowledge graph as are connected to an answer on the first knowledge graph associated with the set of text of the original passage.

16. The computer system of claim 13, wherein the program instructions to select the first subset associated with the knowledge graph most similar to the first knowledge graph associated with the set of text of the original passage comprise program instructions to choose a subset with a least number of words with a similar knowledge graph.

17. The computer system of claim 13, wherein the policy for content usage specifies one or more conditions for usage of the content asset, wherein the content asset is information controlled by a knowledge source, and wherein the policy for content usage includes one or more of a copyright fair use factor, a contract rule, a publication rule, a citation restriction, and a document guideline.

* * * * *